Aug. 20, 1957 G. HARKENSEE 2,803,770

ELECTRON DISCHARGE TUBE APPARATUS

Filed Sept. 11, 1951

Inventor:

Georg Harkensee

By: [signature]

2,803,770

ELECTRON DISCHARGE TUBE APPARATUS

Georg Harkensee, Darmstadt, Germany, assignor to Fernseh G. m. b. H., Darmstadt, Hessen, Germany Application September 11, 1951, Serial No. 246,005

Claims priority, application Germany September 18, 1950

17 Claims. (Cl. 313—84)

Figures 1, 2, 3, 4A, 4B, 5:
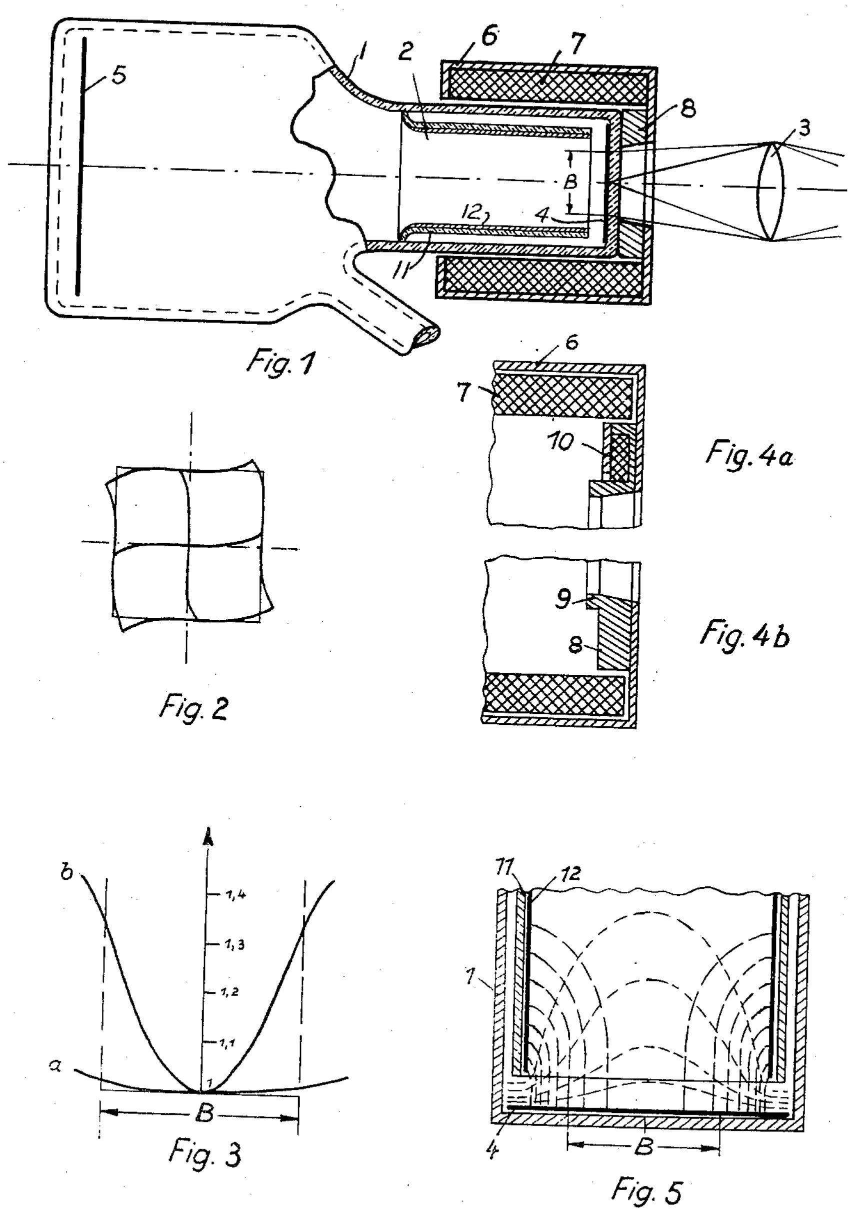

The present invention comprises improvements in or relating to electron discharge tube apparatus and is more particularly concerned with such apparatus employing a photocathode of extended area which is used in television and in other branches of electrical communication technique, especially in the image converter section of image storage tubes. Image converters contain a photocathode on which an image of the picture to be transmitted is focused optically and which in accordance with the brightness of the different elementary optical image points emits a corresponding number of photo-electrons. The electrons emitted from each point are focused by suitable electron-optical means, for example coils carrying direct current, on a further usually plane electrode, where (in the case of an iconoscope) they are stored in order to produce an electrical charge image or (in the case of a pure image converter) excite a fluorescent screen to luminescence.

Considerable difficulties are involved in forming undistorted and sharp images on large sections of the cathode surface by electron-optical means. These difficulties are particularly great, when the external dimensions of the image converter tube and the electron-optical means associated with it must be kept small, which is necessary for example with mobile installations for the transmission of television images. Although image converters have found wide application in television technique for a good many years, it has not hitherto been possible with image converters of normal size to form larger images on the photocathode. Thus for example, with an external diameter of the cylindrical bulb of the tube of about 50 mm. it has not proved possible to produce an image format of more than 7 x 9 mm. and to transmit this without distortion and sharply focused at the edge zones with the accuracy required for television images.

The invention has for its object the provision of an especially advantageous construction of the system effecting the focusing of the electrons emitted from the cathode, by means of which it is possible, without increasing the external dimensions of image converter tube or focusing system and without appreciable additional outlay, to increase by several times the maximum permissible format of the image to be transmitted, the sharpness and freedom from distortion remaining the same or being improved.

Another object of the invention is to increase the sharpness near the edges of the transmitted picture. Other objects will appear in the following description.

The invention depends on the recognition of the fact that in an image converter system for television tubes the lines of force of the electromagnetic focusing field in the plane of the photo-cathode should intersect the photo-cathode essentially normally, but the field strength of this focusing field should not, as has been hitherto assumed, be as homogeneous as possible, but should increase considerably from the middle towards the edge, if it is desired to obtain distortion-free images.

According to the invention therefore there is provided electron discharge tube apparatus employing a photo-cathode of extended area and electromagnetic means for focusing an electron image formed by the cathode at a predetermined position within the tube and wherein the focusing means is of such construction that the lines of force of the magnetic focusing field intersect the surface of the photo-cathode substantially normally while the strength of this field increases from the centre to the effective edge thereof by at least 25 percent.

It is advantageous to screen the edge zone of the photo-cathode which is not used in the formation of the electron image with a pole-piece of ferromagnetic material which is placed within the coil used to produce the focusing field.

For the transmission of images with rectangular format the pole-piece is suitably shaped so as to be axially symmetrical and is disposed in a position such that the boundary line of the central hole therein just encloses the corners of the image with zero or very slight clearance. In many cases it is advantageous to provide the pole piece with an auxiliary winding fed with an exciting current and enclosing the hole coaxially.

By the use of the invention it is possible, with image storage tubes having an electron image section (for example, an image iconoscope), to enlarge the image format on the photocathode from 7 x 9 mm. to 15 x 20 mm. and in this way to obtain a light gain or an increase of sensitivity of five times. Thus a very important advantage is achieved in that it is possible to use television cameras employing the present invention in many cases in which television transmissions have not hitherto been possible due to the low level of illumination existing, without the dimensions or the weight of the camera being increased.

The invention will be hereinafter more particularly described with reference to the accompanying drawing comprising Figures 1 to 5 which illustrate, by way of example, different embodiments of the invention.

Referring to the drawing:

Figure 1 illustrates partially in section an image storage tube with an image converter system constructed in accordance with the invention, Figure 2 illustrates the image aberrations which occur with image converter systems, Figure 3 illustrates the pattern of the magnetic field strength on the photocathode.

Figure 4*a* and Figure 4*b* illustrate partial views of different embodiments of the image converter system, and Figure 5 illustrates the pattern of the electric lines of force in the vicinity of the photocathode.

Figure 1 illustrates schematically an image storage tube 1 of the image iconoscope type which possesses a cylindrical image converter section 2 having an anode surface layer 12 deposited on an inner surface of glass cylinder 11. An optical image of the object to be transmitted is formed by means of a lens 3 on the photo-cathode 4. This photocathode has an outer face facing the end wall of the tube for receiving an optical image, and an inner face for emitting electrons. The electron image corresponding to the optical image is required to be transferred sharply and without distortion through the image converter system to reach the storage electrode 5 where it is transformed into an electrical charge image. The electron-optical means consist essentially of a coil 7, coaxial with the image converter system which is enclosed by an iron casing 6 and is traversed by an adjustable direct current, together with an electrostatic lens, which is formed by the electrostatic field between the photocathode and the positive anode cylinder 12. Details of this arrangement are represented in Figure 5.

In television camera tubes constructed hitherto which incorporate an image section and a storage target electrode the side of the photocathode 4 facing the lens 3 has been covered with an image mask which exposes only the central part of the photocathode required for the transmission of the image. Screening off the edge zone of the photocathode prevents this part being excited by stray light and avoids the resultant lowering of the quality of the image which manifests itself inter alia in an increase in the noise level.

However, in all camera tubes of the storage type employing an image section so far proposed the transferred image formed electron-optically on the storage electrode 5 becomes to some extent distorted, in such a way that vertical and horizontal lines in the vicinity of the edge of the image, especially in the corners of the image, are reproduced with a slight curvature, so that for example a transmitted rectangle is distorted into an S-shape, as is represented somewhat exaggerated in Figure 2. Attempts have not been lacking to overcome this distortion. Hitherto it has been assumed that the distortion arises from inhomogeneities of the magnetic field employed to form the electron-optical image and efforts have been made to obtain fields as homogeneous as possible in the region of that part of the photocathode which is used for the transmission of the image. To this end, in preferred constructions hitherto employed, the coil 7 producing the magnetic field was elongated to such an extent that the photocathode was positioned within the coil. Nevertheless, it was not possible to eliminate entirely the distortion represented in Figure 2. If it was desired to keep the distortion within tolerable limits, only a relatively very small zone of the central part of the photocathode could be used for the transmission of the image. Since the magnetic field is practically homogeneous in the region in the immediate vicinity of the axis of the coil, or in any case only the slightest variations from homogeneity occur in this region, it was considered that this constituted a confirmation of the prevailing view that even slight inhomogeneities of the magnetic field, which are unavoidable in practice, produce distortions.

In Figure 3 the curve *a* shows the plot of the density of the magnetic lines of force measured in an image converter system of such a known type, the measurement being in arbitrary units in the region of the central zone B of the photocathode 4 used for the transmission of the image. It is seen that the variation in the density of the lines of force in the edge zones is only about 2% of the value obtaining at the centre of the image. In contrast to the view hitherto prevailing, it has been found that the geometrical distortion of the image represented in Figure 2 practically entirely disappears if the density of the lines of force on the photocathode increases by about 35% from the middle to the edge of the image; this means that the density of the lines of force will vary in accordance with curve *b* of Figure 3.

This pattern of the lines of force can be attained in a relatively simple way by replacing the diaphragm hitherto used for covering the photocathode by a pole-piece plate 8 of ferromagnetic material of corresponding thickness and fulfilling the same optical function.

Figure 4 shows a somewhat different construction for the pole-piece plate 8. Parts corresponding to one another are indicated in Figures 1 and 4 by the same reference numerals. The axial aperture of the pole-piece is extended outwards in a conical or stepped conical form so that the incident rays from the image-forming lens can reach the photocathode of the image storage tube unhindered and without vignetting. The ratio of the diameter of the aperture of the pole-piece to the thickness thereof is about 3:1, since with this ratio of dimensions it is possible to attain the best picture quality for the transmitted image or the most favourable distribution of the lines of force in the region of the photocathode for achieving this best picture quality. The pole piece 8 is provided with a projecting collar 9 on the side facing towards the photocathode. The pole piece may be formed entirely of ferromagnetic material as is schematically illustrated by the completely cross hatched section shown in Fig. 4*b* or, in another embodiment of the invention, the pole piece may have a coil disposed therein completely surrounding the aperture as is schematically illustrated by winding 10 shown in Fig. 4*a*.

In order to allow for the unavoidable tolerances arising in the mass production of camera tubes of the storage type employing an image section on the one hand and magnetic coils and pole pieces on the other it may be suitable to arrange within the pole-piece 8 an auxiliary winding 10 which carries an exciting current and coaxially encloses the pole-piece apertures. This auxiliary winding is shown only in part in Fig. 4 but it is to be understood that the winding completely surrounds the aperture in the pole piece in this embodiment of the invention. My adjustment of the strength of the exciting current the relatively small remanent image aberrations caused by the above-mentioned tolerances may be eliminated.

Figure 5 is an enlarged representation, true to scale, of the portion of the storage tube 1 which includes the photocathode 4 illustrated in Figure 1. Inside the image converter section of the image storage tube there is a glass cylinder 11, which is provided on its inner side with a conducting coating, for example, a layer of silver 12, which is maintained at a positive potential of about 800 volts with respect to the photocathode 4. A field of electric force is formed between the photocathode 4 and the coating 12. The approximate pattern of the lines of electric force as recorded in an electrostatic trough is shown by dotted lines. The dashed curves represent the magnetic flux pattern. It may be seen from this and from curve *b* of Fig. 3 that the magnetic field substantially increases in strength from the centre of the photocathode towards the edge. Fig. 5 also illustrates that the magnetic lines of force are normal to the surface of the photocathode. Probably there is a connection between firstly, the requirement that the field strength of the electro-magnetic field of the image converter system should be allowed to increase considerably from the centre of the photocathode towards the edge and, secondly, the hereinbefore mentioned increase of the gradient of the electrostatic field, but these relationships have not as yet been completely explained mathematically and physically.

What I claim is:

1. An electron discharge tube, comprising in combination, an envelope; an extended photocathode arranged in said envelope and having a surface receiving an optical image having a rectangular shape, said surface having an edge zone; a pole piece consisting of ferromagnetic material and having an axially symmetrical shape, said pole piece screening said edge zone of said surface of said photocathode against the light rays impinging on said surface of said photocathode, said pole piece having a central aperture having a boundary clearing the corners of an electron image formed by said cathode; and electromagnetic means including a focusing coil surrounding said pole piece, said electromagnetic means focusing the electron image at a predetermined position in the tube, said electromagnetic means together with said pole piece generating a magnetic focusing field so that the lines of force of the magnetic focusing field intersect said surface of said photocathode normally, the strength of the magnetic focusing field increasing from the center thereof toward said edge zone of said surface of said photocathode by at least 25 percent.

2. An electron discharge tube, comprising in combination, an envelope; an extended photocathode arranged in said envelope and having a surface receiving an optical image, said surface having an edge zone; a pole piece consisting of ferromagnetic material, said pole piece being arranged outside said envelope and screening said edge zone of said surface of said photocathode against the light rays impinging on said surface of said photocathode, said pole piece having a central aperture; and electromagnetic means including a focusing coil surrounding said pole piece, said electromagnetic means focusing the electron image at a predetermined position in the tube, said electromagnetic means together with said pole piece generating a magnetic focusing field so that the lines of force of the magnetic focusing field intersect said surface of said photocathode normally, the strength of the magnetic focusing field increasing from the center thereof toward said edge zone of said surface of said photocathode by at least 25 percent.

3. An electron discharge tube, comprising in combination, an envelope; an extended photocathode arranged in said envelope and having a surface receiving an optical image, said surface having an edge zone; a pole piece consisting of ferromagnetic material, said pole piece screening said edge zone of said surface of said photocathode against the light rays impinging on said surface of said photocathode, said pole piece having a central aperture, said aperture of said pole piece having a conical shape flaring in axial direction away from said envelope; and electromagnetic means including a focusing coil surrounding said pole piece, said electromagnetic means focusing the electron image at a predetermined position in the tube, said electromagnetic means together with said pole piece generating a magnetic focusing field so that the lines of force of the magnetic focusing field intersect said surface of said photocathode normally, the strength of the magnetic focusing field increasing from the center thereof toward said edge zone of said surface of said photocathode by at least 25 percent.

4. An electron discharge tube, comprising in combination, an envelope; an extended photocathode arranged in said envelope and having a surface receiving an optical image, said surface having an edge zone; a pole piece consisting of ferromagnetic material, said pole piece screening said edge zone of said surface of said photocathode against the light rays impinging on said surface of said photocathode, said pole piece having a circular aperture, the ratio of the diameter of said circular aperture to the thickness of said pole piece in axial direction of the tube being approximately 3:1; and electromagnetic means including a focusing coil surrounding said pole piece, said electromagnetic means focusing the electron image at a predetermined position in the tube, said electromagnetic means together with said pole piece generating a magnetic focusing field so that the lines of force of the magnetic focusing field intersect said surface of said photocathode normally, the strength of the magnetic focusing field increasing from the center thereof toward said edge zone of said surface of said photocathode by at least 25 percent.

5. An electron discharge tube, comprising in combination, an envelope; an extended photocathode arranged in said envelope and having a surface receiving an optical image, said surface having an edge zone; a pole piece consisting of ferromagnetic material, said pole piece screening said edge zone of said surface of said photocathode against the light rays impinging on said surface of said photocathode, said pole piece having a central aperture; a winding adapted to be fed with an exciting current disposed coaxially about said aperture of said pole piece and electromagnetic means including a focusing coil surrounding said pole piece, said electromagnetic means focusing the electron image at a predetermined position in the tube, said electromagnetic means together with said pole piece generating a magnetic focusing field so that the lines of force of the magnetic focusing field intersect said surface of said photocathode normally, the strength of the magnetic focusing field increasing from the center thereof toward said edge zone of said surface of said photocathode by at least 25 percent.

6. An electron discharge tube comprising, in combination, an envelope having an elongated end portion formed with a transversal end wall; a photocathode arranged in said end portion of said envelope adjacent to said end wall and having an outer face facing said end wall for receiving an optic image, and an inner face adapted to emit electrons, said photocathode having a central portion and an edge portion surrounding said central portion; a storage electrode arranged within said envelope spaced from said photocathode for receiving the electrons emitted from said inner face of said cathode; a tubular magnetic focusing member arranged about said end portion of said envelope surrounding said photocathode therein and projecting forwardly beyond said photocathode; and an annular pole piece arranged adjacent said outer face of said photocathode and having a size corresponding to said edge portion of said photocathode.

7. An electron discharge tube comprising, in combination, an envelope having an elongated end portion formed with a transversal end wall; a photo cathode arranged in said end portion of said envelope adjacent to said end wall and having an outer face facing said end wall for receiving an optic image, and an inner face adapted to emit electrons, said photo cathode having a central portion and an edge portion surrounding said central portion; a storage electrode arranged within said envelope spaced from said photo cathode for receiving the electrons emitted from said inner face of said cathode; a tubular magnetic focusing member arranged about said end portion of said envelope surrounding said photo cathode therein and having a rear end portion projecting rearwardly beyond said end wall of said envelope; an annular pole piece formed with an opening and being arranged outside of said envelope adjacent said transversal end wall thereof within said rear portion of said tubular magnetic focusing member; and a metallic shielding tube surrounding said tubular magnetic focusing member and having at the rear end a transversal end wall enclosing said annular pole piece, said transversal end wall of said metallic tube having an opening therein corresponding in size substantially to the opening within said annular pole piece.

8. An electron discharge tube comprising, in combination, an envelope having an elongated end portion formed with a transversal end wall; a photo cathode arranged in said end portion of said envelope adjacent to said end wall and having an outer face facing said end wall for receiving an optic image, and an inner face adapted to emit electrons, said photo cathode having a central portion and an edge portion surrounding said central portion; a storage electrode arranged within said envelope spaced from said photo cathode for receiving the electrons emitted from said inner face of said cathode; a tubular magnetic focusing member arranged about said end portion of said envelope surrounding said photo cathode therein and projecting forwardly beyond said photo cathode; and an annular pole piece formed with a conically shaped aperture which flares in axial direction away from said envelope, said pole piece being arranged adjacent said outer face of said photo cathode and having a size corresponding to said edge portion of said photo cathode.

9. An electron discharge tube comprising, in combination, an envelope having an elongated end portion formed with a transversal end wall; a photo cathode arranged in said end portion of said envelope adjacent to said end wall and having an outer face facing said end wall for receiving an optic image, and an inner face adapted to emit electrons, said photo cathode having a central portion and an edge portion surrounding said central portion; a storage electrode arranged within said envelope spaced from said photo cathode for receiving the electrons emitted from said inner face of said cathode; a tubular magnetic focusing member arranged about said end portion of said envelope surrounding said photo cathode therein and projecting forwardly beyond said photo cathode; and an annular pole piece formed with a circular aperture having a diameter equal to approximately three times the thickness of said pole piece in axial direction of said discharge tube, said pole piece being arranged adjacent said outer face of said photo cathode and having a size corresponding to said edge portion of said photo cathode.

10. An electron discharge tube as set forth in claim 7 wherein said tubular magnetic focusing member and said annular pole piece are disposed relative to one another so as to provide a magnetic focusing field which increases in strength by at least 25% from the center of the photo cathode toward said edge zone thereof, and which has lines of force normal to the surface of said photo cathode.

11. An electron discharge tube as set forth in claim 10 wherein the opening formed in said annular pole piece flares in axial direction away from said envelope.

12. An electron discharge tube as set forth in claim 10 in which the opening formed in said annular pole piece is circular and has a diameter equal to approximately three times the thickness of said pole piece in axial direction of the tube.

13. An electron discharge device comprising, in combination, a photo cathode electrode having a first surface upon which an optical image may be projected, said surface having an edge zone; a pole piece consisting of ferromagnetic material positioned adjacent said photocathode, said pole piece being formed with a central aperture having an axis which is substantially perpendicular to said surface; and electromagnetic means disposed about said pole piece for providing a magnetic focusing field which has lines of force normal to said surface, and which substantially increases in strength from the center portion of said surface toward said edge zone.

14. An electron discharge device comprising, in combination, a photocathode electrode having a first surface upon which an optical image may be projected, said surface having an edge zone; a pole piece consisting of ferromagnetic material positioned adjacent said photocathode, said pole piece being formed with a central aperture having an axis which is substantially perpendicular to said surface; and electromagnetic means disposed about said pole piece for providing a magnetic focusing field which has lines of force normal to said surface, and which increases in strength by at least 25% from the center portion of said surface toward said edge zone.

15. An electron discharge device comprising, in combination, a photocathode electrode having a surface portion from which an optical image may be projected and from which an electron image may be derived; and electromagnetic means positioned adjacent said electrode for generating a magnetic field for focusing said electron image which has lines of force normal to the surface of said electrode, and which substantially increases in strength from the center portion of said surface toward the edge portion of said surface.

16. An electron discharge device comprising, in combination, a photocathode electrode having a surface portion upon which an optical image may be projected and from which an electron image may be derived; and electromagnetic means positioned adjacent said electrode for generating a magnetic field for focusing said electron image which has lines of force normal to the surface of said electrode, and which increases in strength by at least 25% from the center portion of said surface toward the edge portion of said surface.

17. An electron discharge device comprising, in combination, an envelope; a photo cathode electrode having a surface portion upon which an optical image may be projected disposed in said envelope, said surface having an edge zone; a pole piece formed of ferromagnetic material positioned adjacent said electrode so as to screen at least a portion of said edge zone from rays of light which would normally impinge thereon, said pole piece being formed with a central aperture; and electromagnetic means including a focusing coil about said pole piece for focusing an electron image at a predetermined position in said device, said electromagnetic means together with said pole piece generating a magnetic focusing field which intersects said surface normally, and which increases in strength from the center of said surface toward said edge zone by at least 25%.

References Cited in the file of this patent

UNITED STATES PATENTS

| | | |
|---|---|---|
| 2,131,185 | Knoll | Sept. 27, 1938 |
| 2,203,734 | Lubszynski | June 11, 1940 |
| 2,219,113 | Ploke | Oct. 22, 1940 |
| 2,219,193 | Mynall | Oct. 22, 1940 |
| 2,513,221 | Webb | June 27, 1950 |
| 2,572,644 | McGee | Oct. 23, 1951 |